(12) United States Patent
Werline (10) Patent No.: US 9,035,944 B2
(45) Date of Patent: May 19, 2015

(54) 3-D MODEL VIEW MANIPULATION APPARATUS

(75) Inventor: Curtis G. Werline, Madison, AL (US)

(73) Assignee: Intergraph Corporation, Madison, AL (US)

( * ) Notice: Subject to any disclaimer, the term of this patent is extended or adjusted under 35 U.S.C. 154(b) by 974 days.

(21) Appl. No.: 12/851,860

(22) Filed: Aug. 6, 2010

(65) Prior Publication Data

US 2012/0032958 A1 Feb. 9, 2012

(51) Int. Cl.
*G06T 17/00* (2006.01)
*G06T 19/20* (2011.01)

(52) U.S. Cl.
CPC ......... *G06T 19/20* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 6,801,217 B2 | 10/2004 | Andersson | 345/648 |
| 6,879,322 B2* | 4/2005 | Iida et al. | 345/419 |
| 7,110,005 B2* | 9/2006 | Arvin et al. | 345/619 |
| 7,516,102 B2* | 4/2009 | Takamine | 705/51 |
| 7,782,319 B2 | 8/2010 | Ghosh et al. | 345/427 |
| D623,657 S | 9/2010 | Fitzmaurice et al. | D14/488 |
| 7,814,436 B2 | 10/2010 | Schrag et al. | 715/851 |
| 2008/0238916 A1 | 10/2008 | Ghosh et al. | 345/419 |
| 2009/0083645 A1 | 3/2009 | Fitzmaurice et al. | 715/768 |
| 2009/0085911 A1 | 4/2009 | Fitzmaurice et al. | 345/419 |
| 2011/0066963 A1 | 3/2011 | Schrag et al. | 715/769 |

FOREIGN PATENT DOCUMENTS

| | | | |
|---|---|---|---|
| CN | 101093605 A | 12/2007 | G08B 19/00 |
| CN | 101751481 A | 6/2010 | G06F 17/50 |

OTHER PUBLICATIONS

[online], [retrieved Jan 2, 2013], "Blender Wiki Manual", URL: http://archive.org/details/BlenderWikiManualPdf20100622, pp. 28, 54, 99, 195-197, 216, Jun 6, 2010.*
"IRIX Interactive Desktop User Interface Guidelines", URL: http://techpubs.sgi.com/library/tp/cgi-bin/download.cgi?coll=0650&db=bks&docnumber=007-2167-006, pp. 273-274, 2001.*
[online], [retrieved Jan 4, 2013], "DAX Studio: Artist Guide", URL: http://www.google.com/url?q=ftp://217.76.186/Install/Graphic/3D%2520Graphic/DAZStudio/DAZStudio%25203D%2520manual.pdf&sa=U&ei=OY3nUP0dhc7ZBdffgMgL&ved=0CC8QFjAE&usg=AFQjCNE01omMDvG2Gspq3QZ2sID0xz7TjA, pp. 85-86, Feb 8, 2009.*
Khan, et al, "ViewCube: A 3D Orientation Indicator and Controller", I3D 2008 Conference Proceedings, ACM Symposium on Interactive 3D Graphics, pp. 17-25, Feb. 2008.*

(Continued)

*Primary Examiner* — Ulka Chauhan
*Assistant Examiner* — Patrick F Valdez
(74) *Attorney, Agent, or Firm* — Sunstein Kann Murphy & Timbers LLP (57) ABSTRACT

A 3-D view manipulation apparatus surrounds a 3-D model displayed on a display device, and allows a user to manipulate the view of the model by manipulating the apparatus, without having to divert the user's view from the model. The apparatus is transparent or semi-transparent, such that all of its surfaces are simultaneously visible. The apparatus may include control features on its surface, edges, or corners to facilitate changing the view of the model to a vantage point from or through that control feature. The apparatus may include a set of orthogonal axes at its center, about which the model may be made to rotate.

37 Claims, 10 Drawing Sheets

(56) References Cited

OTHER PUBLICATIONS

[online], [retrieved Jan 3, 2013], URL: http://www.i3dtutorials.com/tutorial/44_transforming-with-the-bounding-box-manipulator, Apr. 21, 2009.*
[online], [retrieved Jan. 2, 2013], "Blender Wiki PDF Manual", http://archive.org/details/BlenderWikiManualPdf20100622, extracted title page, TOC, and pp. 1-60, Jun 6, 2010.*
[online], [retrieved Jan. 3, 2014], "AutoCAD 2010 User's Guide", http://utopia.duth.gr/~aorfan/files/AutoCad2010/en-US/SetupRes/Docs/acad_aug.pdf,extracted pp. 1295-1300, Jan. 2009.*
"IRIX Interactive Desktop User Interface Guidelines", http://techpubs.sgi.com/library/tpl/cgi-bin/download.cig?coll=0650&db=bks&docnumber=007-2167-006, extracted pp. 273-274, 2001.*
Volker, Joseph, Autodesk Design Review; What's New in Autodesk Design Review 2008, Feb. 12, 2007 6 pages.
Volker, Joseph, Autodesk Design Review; What's New in Autodesk Design Review 2008, enlarged figure associated with paragraph "6" of reference AD.
linuxreviews.org, Want to Impress Your Friends with Linux? Use 3D-Desktop, undated.
Howtogeek.com, Get the Beryl/Ubuntu "Desktop Cube" Effect for Windows, Mar. 29, 2007.
Unknown, Printout of Youtube page for video entitled "This is linux beryl 3D desktop (a transparent rotating cube)", Feb. 11, 2007, from http://www.youtube.com/watch?v=E3EBeaCrhn8.
Khan, A., et al., "ViewCube: A 3D Orientation Indicator and Controller," *13D 2008 Conference Proceedings*: ACM Symposium on Interactive 3D Graphics. pp. 17-25.
Unknown, "Chapter 3: Metaphern und Widgets fur interactive 3 D-Anwendungen," *In: Dachselt, R. "Eine declarative Komponentenarchitektur und Interaktionsbausteine fur dreidimensional multimediale Anwenduger*," 2004, Der andere Verlag, pp. 28-86.
T.J. Tuytschaevers using Google Translate, Portions of "Chapter 3: Metaphern und Widgets fur interactive 3D-Anwendungen".
Strauss, P.S. et al., An Object-Oriented 3D Graphics Toolkit, *Computer Graphics*, ACM, vol. 26, No. 2, Jul. 1, 1992, pp. 341-349.
Guindon, M.A., "Learning Maya7-Foundation," pp. 152-153, 165-168, Section "View Compass" p. 153.
Houde, S., "Iterative Design on an Interface for Easy 3-D Direct Manipulation," *Proceedings on the Conference on Human Factors in Computing Systems*, May 3, 1992, pp. 135-142.
Schmidt, R. et al., "Sketching and Composing Widgets for 3D Manipulation," *Computer Graphics Forum*, vol. 27, No. 2, Apr. 1, 2008, pp. 301-310.
Authorized Officer: Doreen Golze, Notification of Transmittal of the International Search Report and the Written Opinion of the International Searching Authority, or the Declaration, PCT/US2011/043674, Feb. 21, 2012, 13 pages.
Authorized Officer: Simin Baharlou, Notification Concerning Transmittal of International Preliminary Report on Patentability, PCT/US2011/043674, Feb. 21, 2013.
Korean Intellectual Property Office Notice of Grounds for Rejection; KR 10-2013-7003009; 10 pages, Jan. 25, 2014.
Darae Law & IP Firm, Notice of Grounds for Rejection; KR 10-2013-7003009; 14 pages Jan. 25, 2014 [English Translation].
Sudarsanam, N, et al., "CubeCam: A Screen-Space Camera Manipulation Tool," *Proceeding SIGGRAPH '05 ACM Siggraph 2005 Posters*, Article No. 93, 11 pages, 2005.
Schmidt, R., et al., "Sketching and Composing Widgets for 3D Manipulation," *Eurographics*, vol. 27, No. 3, 10 pages, 2008.
Chinese Patent Office, Chinese Patent Office Official Action, Application No. 201180034191.8 dated Dec. 2, 2014, 8 pages.
Darae Law & IP Firm, Response to Notice of Grounds for Rejection, Korean Patent Application No. 10-2013-7003009.
Korean Intellectual Property Office, Notice of Final Rejection—Korean Patent Application No. 10-2013-7003009; 4 pages, dated Jul. 29, 2014.
Darae Law & IP Firm, Response after Final Rejection, Korean Patent Application No. 10-2013-7003009, Oct. 29, 2014.
Korean Intellectual Property Office Decision of Granting Patent, Korean Patent Application No. 10-2013-7003009, Nov. 27, 2014.
Dannemann Siemsen, Voluntary amendment, Brazilian patent application No. BR112013000696-0, Nov. 12, 2013.
Kaminski Harmann Patentwanwalte, Voluntary amendment, European Patent Application No. 11735579.2-1502, Sep. 19, 2013, 13 pages.
Patent Examination Report 1, Patent Application No. 2011286316, Date of Issue: Oct. 18, 2013, 4 pages.

* cited by examiner

3-D MODEL VIEW MANIPULATION APPARATUS

TECHNICAL FIELD

The present invention relates to modeling of an object, and more particularly to manipulating the view of a model of an object on a computer display device.

BACKGROUND ART

Many computer systems process graphics data to display models of objects on a screen. For example, computer-aided design ("CAD") systems may display a graphical model of a physical object being designed, or a video game may display virtual objects rendered in a virtual environment.

Figure 1:
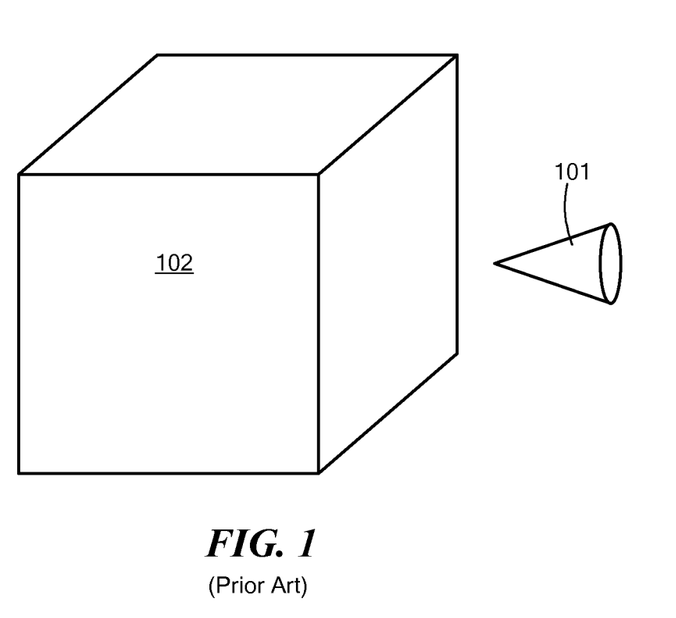
FIG. 1 schematically shows a prior art proxy cube with an orientation cone for selecting a desired view of a model.
Figure 2:
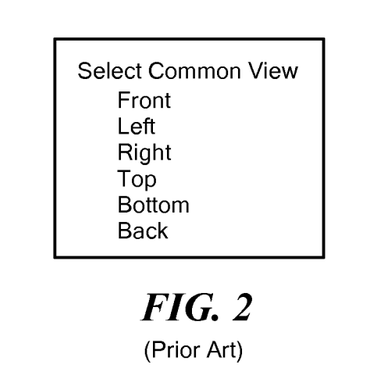
FIG. 2 schematically shows a prior art menu for selecting a desired view of a model.

A user may desire to change the view of the model that appears on the screen. In a CAD environment, for example, the user may desire to view an object being designed from various angles or points of view (which may be known as a "vantage point of the view" or simply "vantage point," or an "eye point"). To change the view of an on-screen model, the user may move a pointer, or cone 101 (FIG. 1), on the screen to point at the model 102 from the desired vantage point, thereby causing the model to rotate to present a view of the model from that vantage point. Alternately, a user may manipulate the view of a model by selecting a pre-defined view from a menu (FIG. 2), or by manipulating the orientation of a proxy image elsewhere on the screen. Each of these examples undesirably requires the user to look away from the model when manipulating the model.

SUMMARY OF ILLUSTRATIVE EMBODIMENTS

In a first embodiment of the invention, graphics data of a 3-D object is processed to render the object, and the object is displayed on a display device. A 3-D view manipulation cube is rendered and displayed so that it surrounds the object, such that the view manipulation cube and the object maintain a fixed orientation to one another when the orientation of the cube is manipulated on the display device. In some embodiments, the apparent size of the object is reduced in reaction to the display of the view manipulation cube, or enlarged in reaction to the termination of the display of the view manipulation cube. The view manipulation cube in some embodiments may include control features on faces, edges, or corners of the cube, and activation of a control feature causes the object to orient itself to from the vantage point of the activated control feature. In illustrative embodiments, the model is at the center of the cube, and six faces, eight corners, and twelve edges of the cube, are simultaneously visible to the user. Text associated with a face may identify the face (e.g., "Front," "Top," "Right," etc.), and the text may itself be presented as a 3-D object or collection of 3-D objects. The cube may be selectively enabled by the user. Some embodiments may include a set of three orthogonal Cartesian coordinate axes at the center of the model. In various embodiments, selection of an axis may cause the model to rotate about that axis for a complete 360 degree review inspection of the model, or to pan the model along the axis. Some embodiments may be implemented in program code on a computer-useable medium, while some embodiments may be implemented on the modules of an apparatus.

BRIEF DESCRIPTION OF THE DRAWINGS

The foregoing features of the invention will be more readily understood by reference to the following detailed description, taken with reference to the accompanying drawings, in which.

DETAILED DESCRIPTION OF ILLUSTRATIVE EMBODIMENTS

Illustrative embodiments of the invention allow a user to manipulate a model of an object on-screen (for example, on a display device such as a computer screen, or projected onto a surface) without requiring the user to avert their eyes from the portion of the display device where the model is displayed. In describing these and similar concepts, the terms "model" and "object" may be used interchangeably to represent the image being displayed. For ease of reference, the display device will be referred to herein as a "screen," although the display device is not limited to display screens.

A view manipulation apparatus shown in concert with the displayed model permits a number of features to enhance a user's interaction with the displayed model. A view manipulation apparatus may take a variety of geometric forms, such as a polyhedron (e.g., cube, box, pyramid), or sphere, to name but a few. A view manipulation apparatus has a virtual surface, and may have faces, edges (e.g., where two faces meet) and corners (where three or more faces meet).

For ease of illustration, the view manipulation apparatus in illustrative embodiments will be shown and described as a cube (and may be referred to as a "view cube"), with the understanding that the term "cube" as used herein is not limited to polyhedron, or to a shape in which all edges are of equal length.

In illustrative embodiments, the view cube is presented as a cubic geometric apparatus with at least portions of all six faces, eight corners, and twelve edges of the cube simultaneously visible to the user.

Illustrative embodiments of a view cube may allow the user to change the apparent orientation of the model on the display device; or may allow a user to zoom-in or zoom-out from the model; and/or may allow a user to rotate the displayed model about one or more axes; and/or may allow a user to pan the model left, right, up or down. The apparent size of the model is independent of the size of the view cube; the vantage point may zoom-in to or zoom-out from the model independently of the apparent size of the view cube.

Figure 3:
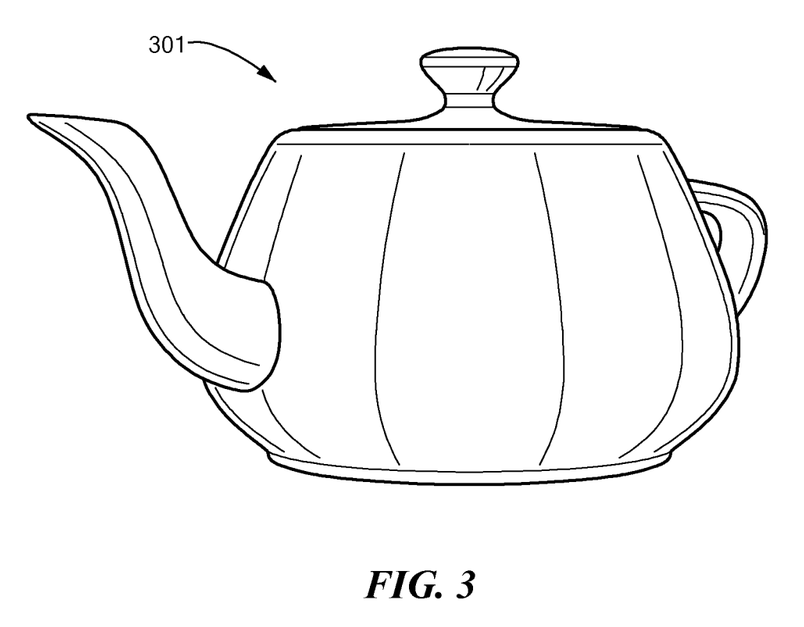
FIG. 3 schematically shows a model of a teapot.

A 3-D model of a teapot 301 is schematically illustrated in FIG. 3. In this figure, although the model is displayed in two dimensions on a two-dimensional viewing screen, various attributes of the image give it an almost three-dimensional appearance. In some embodiments, the model may be displayed in three dimensions using display technologies, as known in the art. To that end, the terms "screen" and "display device" as used herein are not limited to display hardware with a two-dimensional display surface. However, for illustrations described herein, it is understood that references to a "3-D" (or "3D") model refer to a model of a three-dimensional object displayed on a two-dimensional screen.

Figure 4:
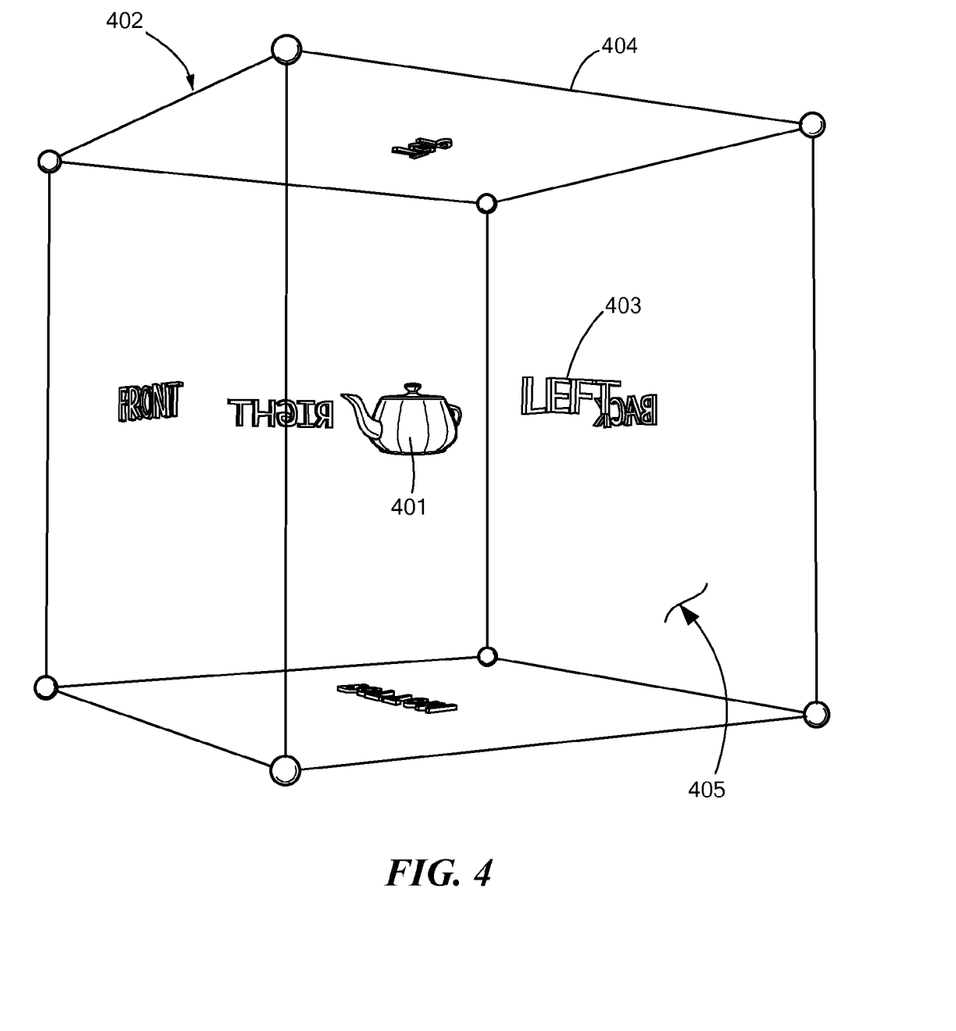
FIG. 4 schematically shows a model of the teapot of FIG. 3 and a view manipulation cube.

In FIG. 4, a teapot 401 is illustrated within a 3-D view manipulation cube 402. In this view, the vantage point of the view is farther from the teapot 301 of FIG. 3 (e.g., as if a camera is "zoomed" out), so that the teapot 401 appears smaller. Nevertheless, the teapot in FIG. 4 is the same model as the teapot in FIG. 3, but it appears relatively smaller; the model has not been scaled. In some embodiments, a zoom-out (i.e., reduction in apparent size of the model) is caused by, or initiated automatically by, the activation of the cube.

The view cube 402 of FIG. 4 is a virtual 3-D structure that surrounds the 3-D model of the teapot 401. The view cube 402 is not a part of the model 401, and exists independently of the model. The view cube has a virtual surface of six faces. Edges are formed where two faces meet, and corners are formed where three faces meet. Various features may appear on the virtual surface (e.g., faces, edges, corners) as described herein.

To present the view cube, illustrative embodiments assess the size and location of the model on the screen. That information is used to process graphics data to identify the size and location of the view cube. Graphics data is processed to render and display the view cube in conjunction with the model.

Using this cube, a user can manipulate the apparent orientation of the model (in this example, the teapot 401) to view the model from any desired vantage point. In FIG. 4, the view is at an angle through the "LEFT" face of the cube, nearer the "FRONT" face of the cube. The text 403 on the faces of the cube may be editable, so that the user can assign names that are meaningful or distinct. For example, if the model were a ship, the text on the faces could be "bow," "stern," "port," and "starboard," etc. The text 403 on the faces of the cube 402 may be presented in user-selectable colors (e.g., "LEFT" and "RIGHT" in red, "FRONT" and "BACK" in blue, and "TOP" and "BOTTOM" in green).

To change or manipulate the view of the model 401, the user operates or manipulates a control point (or "control element" or "control feature") associated with (i.e., on) the cube 402. For example, to interact with the cube 402, the user may use a computer mouse, a touch pad, or graphics tablet. The model 401 and cube 402 have a fixed orientation with respect to each other, such that manipulating the orientation of the cube 402 causes the view of the model 401 to change along with the orientation of the cube 402. In this way, users do not need to take their eyes off of the model 401 within the cube 402. Thus, users can monitor the orientation of the model 401 as they manipulate the cube 402, stopping when the model 401 is in the desired orientation. At that point, users may terminate or suspend the display of the cube 402, or make the cube 402 entirely transparent. In illustrative embodiments, the model 401 returns to its previous size on the screen.

Figure 5A:
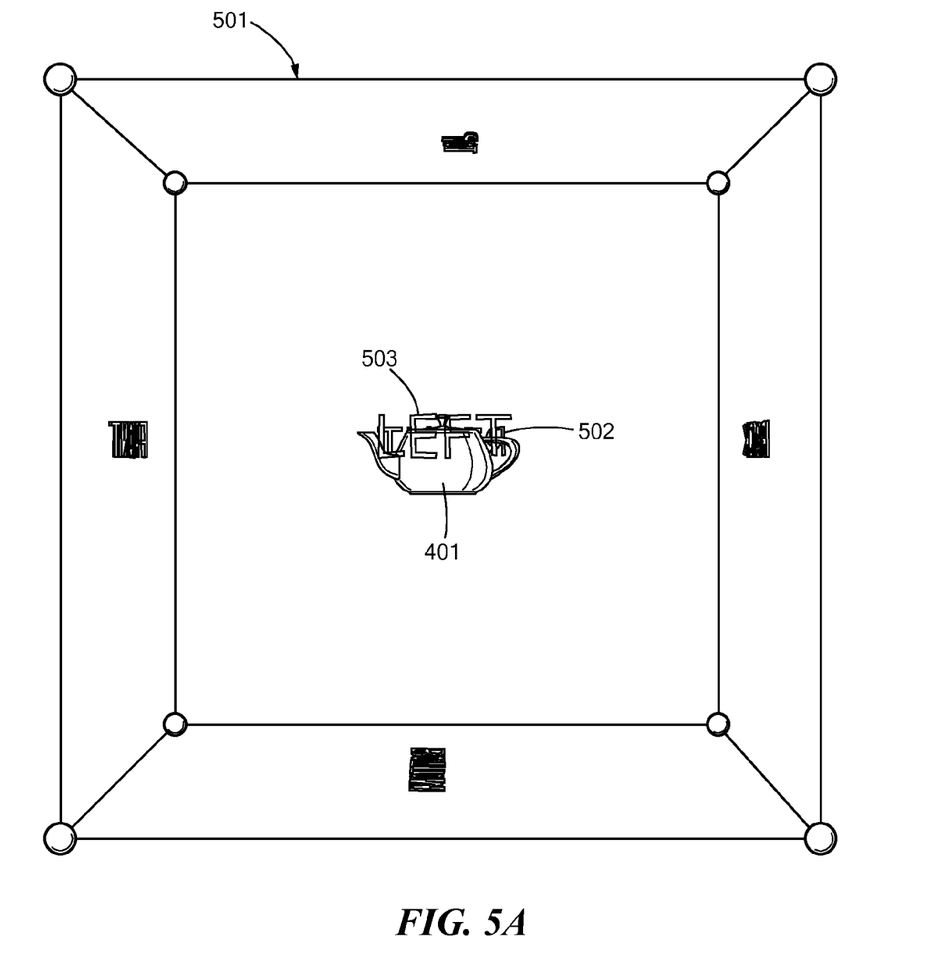
FIG. 5A schematically shows a model of the teapot viewed through the left face of a view manipulation cube.
Figure 5B:
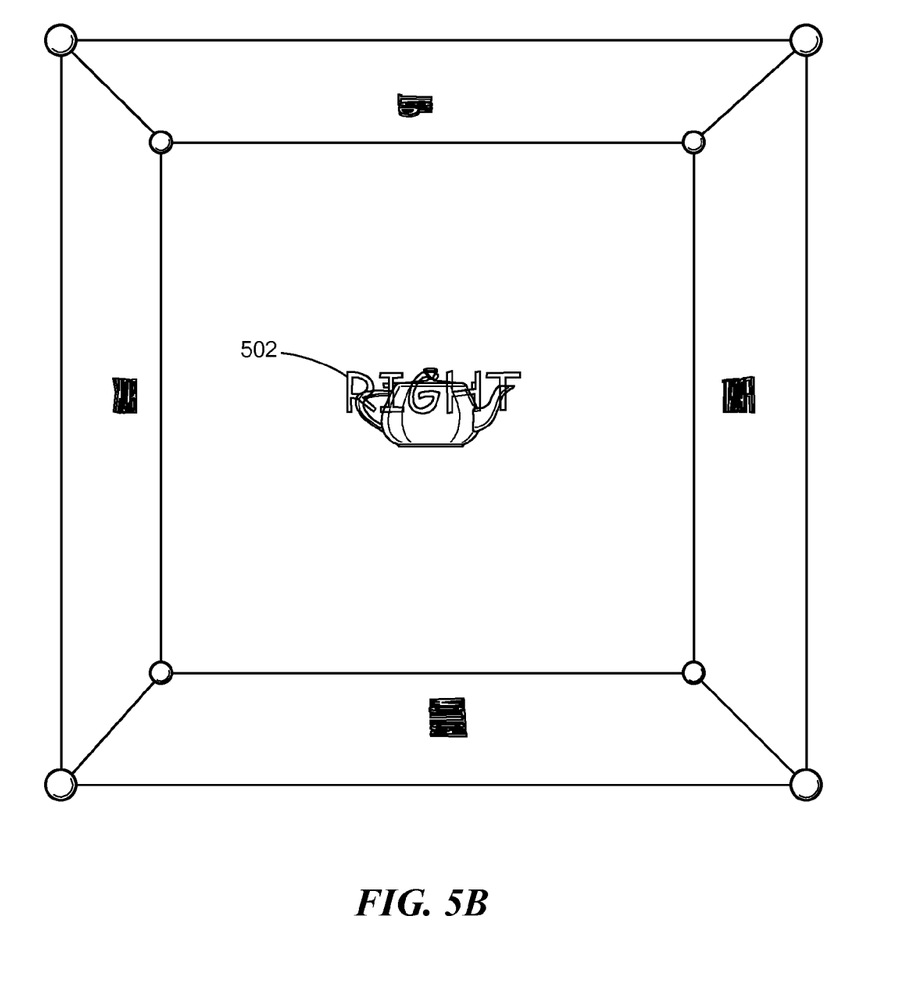
FIG. 5B schematically shows a model of the teapot viewed through the right face of a view manipulation cube.

If a user viewing the teapot model 401 in FIG. 4 wanted to view the model 401 directly through the "LEFT" face 405 of the cube, the user could click on the word "LEFT" 403 (or a letter within that word), and in illustrative embodiments the model 401 and the cube 402 rotate to that view (see, for example, FIG. 5A). As such, the text on a face of a cube may be a control feature. In some embodiments, clicking a blank space on the screen prior to the completion of the rotation (i.e., prior to when the model 401 has rotated to the new view) stops the rotation to freeze the view at that moment.

FIG. 5A schematically shows a view of the teapot model 401 through the left face of the cube 501. If the user wanted to view the model through the right face of the cube 501, the user could use a computer mouse to click on the word "RIGHT," which in FIG. 5A is behind the model 401 of the teapot. Then, in illustrative embodiments, the model 401 and cube 501 rotate to show the model 401 through the right face of the cube 501. In some embodiments, rather than rotate to a selected view, the new view is simply presented immediately (e.g., the model may "snap to" the new view). However, rotating to the selected view may assist users to maintain their sense of the model's context, which may benefit their current orientation.

Figure 5C:
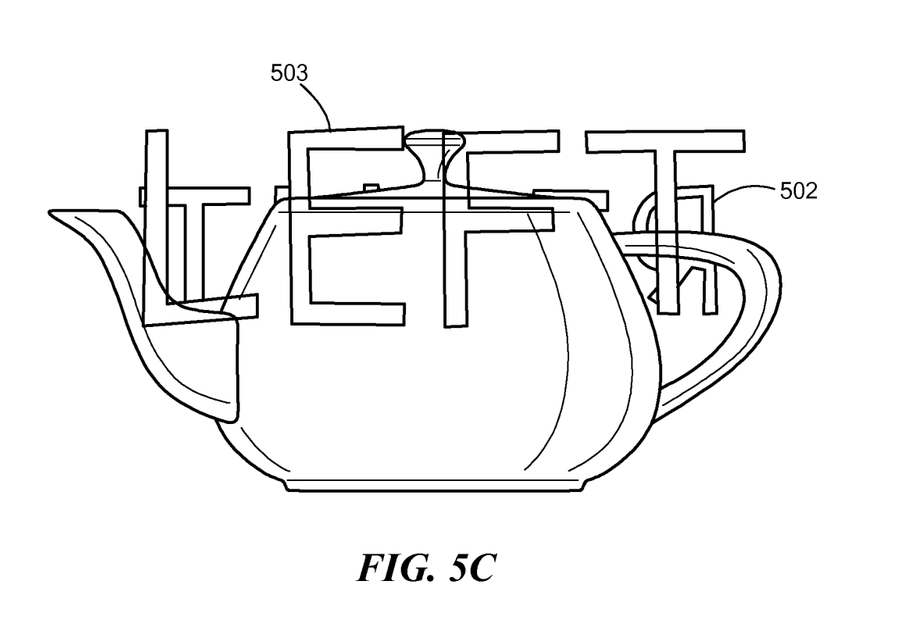
FIG. 5C schematically shows a magnified view of a model of the teapot viewed through the left face of a view manipulation cube.

Although the word "RIGHT" 502 is partially behind, or concealed by, the model of the teapot 401 and the word "LEFT" 503 in FIG. 5A, the word "RIGHT" 502 is nevertheless at least partially visible, and thus is available to be selected, clicked or operated by the user (i.e., if you can see it, you can select or operate it). In FIG. 5C, the letter "T" from the word "RIGHT" 502 is visible near the letter "L" in the word "LEFT" 503. Thus, that letter "T" remains available to the user, even though other portions of the word are behind, or obscured by, the model of the teapot 401.

Also, in the embodiment of FIG. 5C, the word "RIGHT" 502 appears backwards. This is because its associated face is facing away from the viewer, and thus gives a visual cue as to the orientation of that face. In some embodiments, however, the text may be processed so that it always reads frontward and/or upright to the user.

Figure 5D:
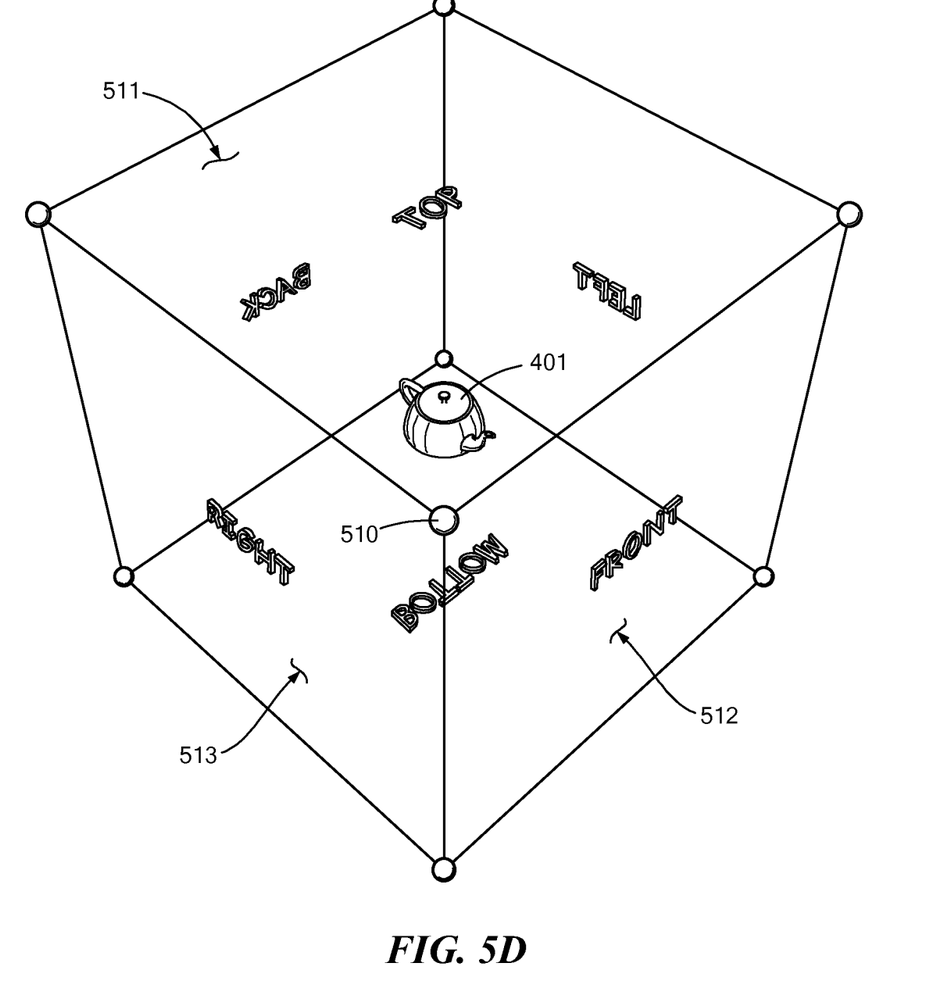
FIG. 5D schematically shows a model of the teapot viewed through a point near a corner of the cube.

In some embodiments, the view cube 501 may be manipulated using control elements (such as the 3-D objects, e.g., spheres) at its corners. Clicking on one of the spheres causes the model to rotate to (or in some embodiments, snap to) a view of the model from the vantage point of that corner. FIG. 5D shows a view of the teapot model 401 from near a sphere 510 at the corner formed by the top 511, front 512 and right 513 faces of the cube.

In some embodiments, the view cube may be manipulated by clicking and dragging a portion of the cube. For example, to change the view in FIG. 4 to the view in FIG. 5A, the user uses a computer mouse to "grab" an edge 404 (or a face 405) of the cube 402 and manipulate the mouse (e.g., click and drag with a mouse), which causes the cube 402 and model 401 to move in response to the motion of the mouse until the desired view is presented. Because they move in concert (for example, synchronously), the cube 402 and model 401 maintain a sense of orientation to the model 401 in space, or the orientation of one part of the model 401 to another part of the model 401.

The font of the text on a face of the cube may be presented as 3-D characters. As such, when the font is rotated, it always appears to have (at least) two dimensions in the plane of the viewing screen. In contrast, if the font were two-dimensional, it would vanish when rotated to be viewed in profile (e.g., as the font on a piece of paper vanishes when the paper is viewed from its edge). As a result, the font remains available as a control element; even if the word is viewed from its edge (i.e., in profile); it can still be seen, and can still be selected by a mouse, for example.

Figure 6A:
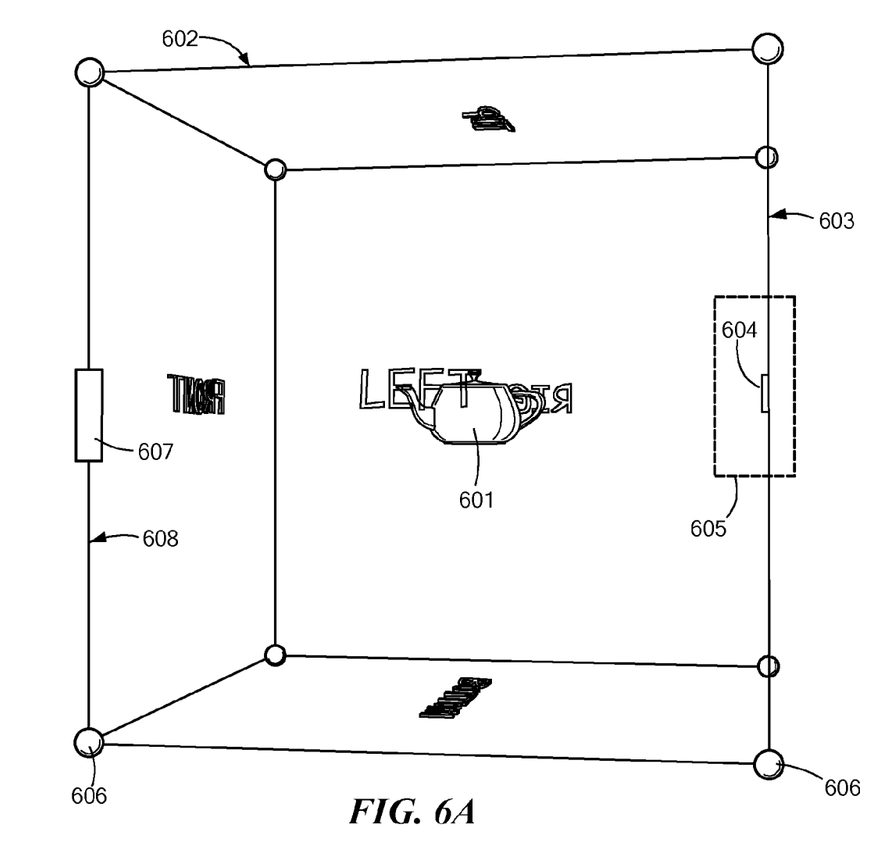
FIG. 6A schematically shows a model of the teapot viewed through the left face of a view manipulation cube with the back face of the cube in profile.
Figure 6B:
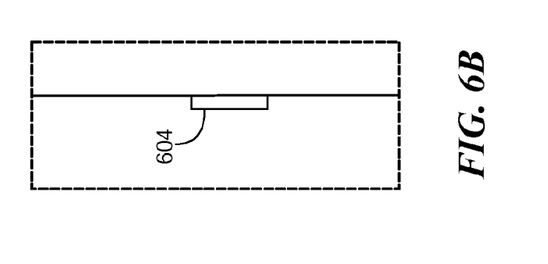
FIG. 6B schematically shows a magnified portion of an edge of the cube in FIG. 6A, along with text in profile.

This is illustrated in FIG. 6A and FIG. 6B. In FIG. 6A, the cube 602 is oriented so that its "BACK" side 603 is seen in profile, towards the right edge of the scene. The word "BACK" 604 is thus not readable, but a portion of it remains visible (i.e., it presents as two-dimensional when viewed in profile and can therefore be selected or operated, as illustrated within the dashed rectangle 605; the dashed rectangle 605 is not part of the model 601 or cube 602; it is included in FIG. 6A only to identify the portion of FIG. 6A that includes the word "BACK" 604 in profile). The portion of FIG. 6A within the dashed rectangle 605 is enlarged in FIG. 6B.

Because the spheres 606 at the corners of the cube 602 may also be presented as 3-D shapes or objects in some embodiments, they also remain visible to the user even in profile. Other 3-D features may be included on the cube, such as a cylinder 607 or other shapes along an edge 608 of the cube 602 which, when selected, rotate the cube 602 to view the model 601 from the vantage point of that edge 608.

In illustrative embodiments, control elements (such as spheres, cylinders or text) may appear semi-translucent until a cursor is near or on the control element. When that happens, the control elements then become less transparent or even opaque. To enhance a viewer's sense of depth perception, control elements or portions of the cube may be subject to a "fog effect," in which features nearer the user in the 3D scene appear brighter than features farther away.

The cube may only be visible when activated by the user, for example. In some embodiments, the cube automatically disappears in response to the user selecting (e.g., clicking-on) a control point such as a word on a face of the cube, or a sphere at a corner of the cube. The cube may disappear immediately upon selection of a control point, or as the model rotates to a selected view, or when the model has arrived at a selected view.

Figure 7:
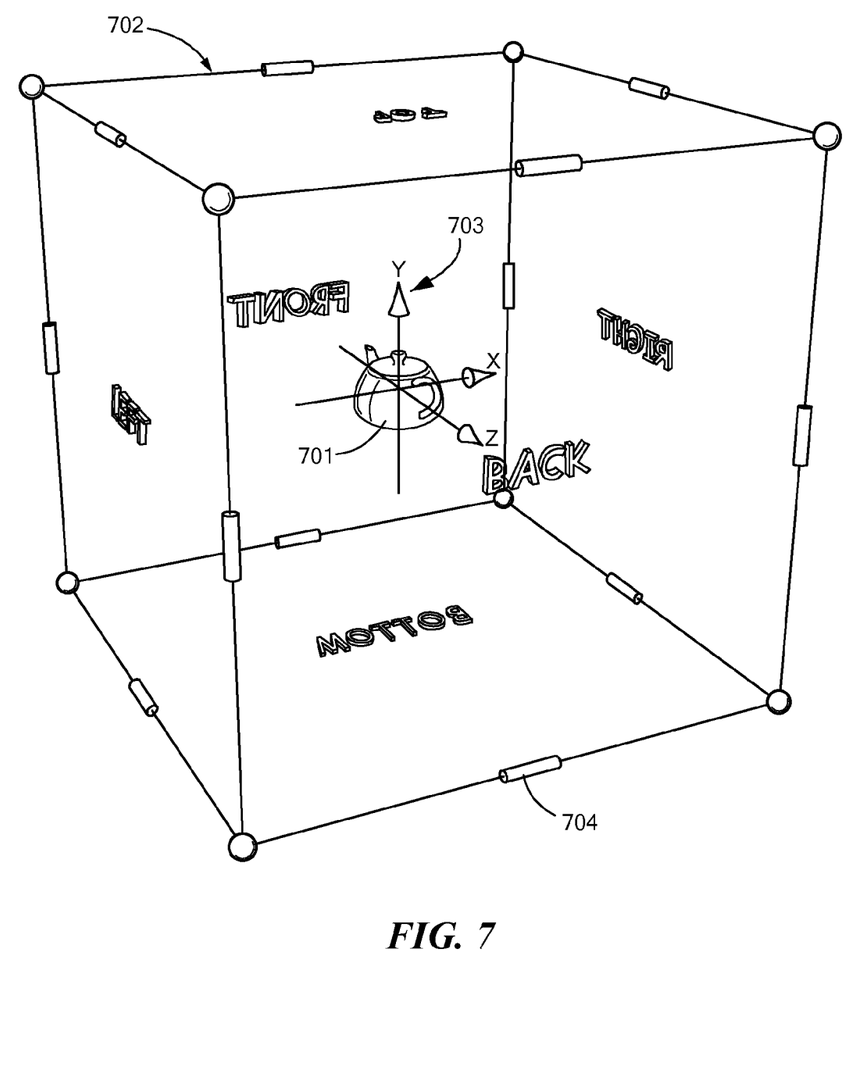
FIG. 7 schematically shows a model of the teapot and a view manipulation cube including a 3-axis Cartesian coordinate system.

Some embodiments include a multiple-axis Cartesian coordinate system 703 associated with the model 701. To that end, a 3-axis (X, Y and Z) coordinate system 703 within a view cube 702 is illustrated in FIG. 7. Other coordinate systems, such as polar or spherical, may likewise be used. Such a coordinate system may provide visual cues to assist in maintaining the user's sense of orientation to the model.

The axes of the coordinate system may be presented with certain indicia. For example, the coordinate system may be presented in color, and the colors may be coordinated with text on the faces of the cube (e.g., X-axis in red, Z-axis in blue, and Y-axis in green).

In some embodiments, selecting an axis of the coordinate system 703 causes the model to rotate about that axis. Selecting another point within the coordinate system causes the model to rotate about that point, or about a line formed by that point and the origin of the coordinate system. Simultaneous rotations in more than one axis may also be implemented. In some embodiments, selecting an axis of the coordinate system 703 (or a designated area on the coordinate system, such as an arrow head on an axis, as just one example) causes the model to pan along that axis. In some embodiments, selecting the intersection of the axes of the coordinate system causes the view of the model to rotate to or snap to a predefined vantage point.

Control features along the edges of the cube where two faces meet may be included in some embodiments, as illustrated by 3-D cylinders 704 in FIG. 7. The view cube may be manipulated using the 3-D cylinders. Clicking on one of the cylinders causes the model to rotate to (or snap to) a view of the model from near the vantage point of that cylinder.

As the user manipulates the model, some embodiments create and maintain a record of the vantage points from which a model is viewed. Such embodiments allow the user to return to a previous view, or navigate forward and backward through the history of views. A user can return to a previous view even if the model has been edited in the time since that view was shown. This enables the user to see recently edited features from a previously viewed vantage point.

Figure 8:
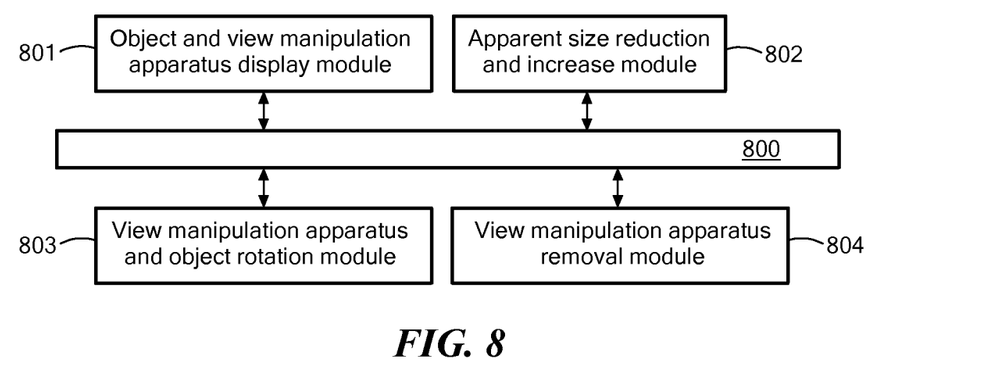
FIG. 8 schematically shows a system that may be configured in accordance with illustrative embodiments of the invention.

An exemplary system or apparatus 800 for implementing a view cube is schematically illustrated in FIG. 8. To that end, an object and view manipulation apparatus display module 801 renders an apparent 3-D image of an object, and displays the object on a screen. The apparent size of the displayed object may be reduced by an apparent size reduction and increase module 802, for example in reaction to a display of a view manipulation cube. A view manipulation apparatus and object rotation module 803 then renders a 3-D image of a view manipulation cube, and displays the cube on the screen, appearing to surround the object. In some embodiments, the view manipulation cube and object rotation module 803 may also render a coordinate system to display along with the view cube, and/or control elements. The view manipulation cube and object rotation module 803 may also allow the object to move in response to manipulation of the view manipulation cube. For example, in illustrative embodiments, the view cube and object share a fixed orientation with respect to one another even when the cube is moved; that is, the object will move in concert with a user's manipulation of the cube. In other words, a user may manipulate the view of the object by manipulating the view cube.

Some embodiments include a view manipulation apparatus removal module 804 which may remove, suspend the display of, hide, or turn-off the view cube. In some embodiments, this may be desirable when, for example, the user no longer desires to use the view cube, after a predetermined period of time (for example, since the view cube was last engaged or used), or if the user wants to view the object without the view cube. The apparent size reduction and increase module 802 may increase the apparent size of the object (i.e., zoom-in), for example when the view cube is turned off.

Figure 9:
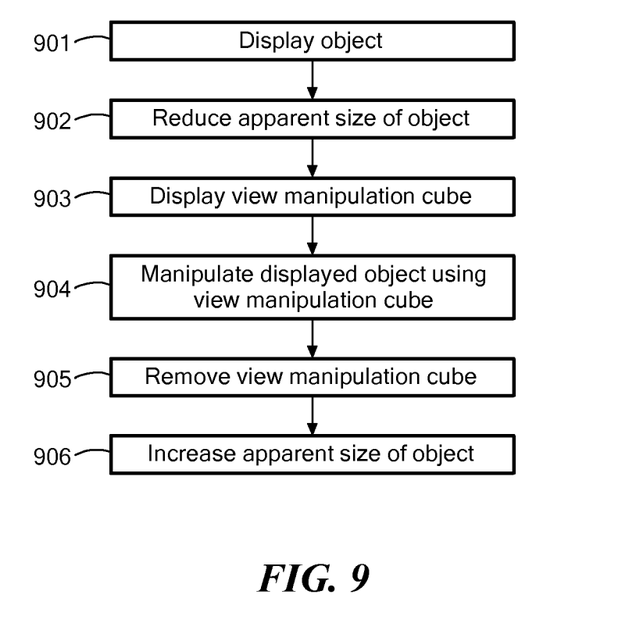
FIG. 9 shows a flow chart for a method of implementing a view cube.

A flow chart illustrating possible embodiments for implementing a view cube is presented in FIG. 9, beginning with the display of a model on a viewing screen (step 901). Depending on how much of the screen is occupied by the displayed model, the apparent size of the model may be reduced (step 902). In some embodiments, the model may be displayed with different apparent sizes, for example, depending on whether the view cube is present. For example, the view of the model may be automatically zoomed-out in reaction to the display of the view cube, or automatically zoomed-in in reaction to the removal of, or termination of the display of, the view cube. In some embodiments, such reduction and enlargement may be a separate step from the initial display of the model.

In this way, the view cube is sized and displayed to surround the model (step 903). In illustrative embodiments noted herein, the view cube and model share a fixed orientation with respect to one another; that is, the model moves in reaction to, and in concert with, a manipulation of the cube. The user may manipulate (step 904) the view cube—for example the user may rotate or otherwise move the view cube, in order to manipulate the view of the model on the screen. The user may optionally remove (or turn off) the view cube (step 905), for example if the user is finished manipulating the model, or simply wants to view the model without the view cube. Similarly, the apparent size of the model may be increased (zoomed-in, step 906), for example when the view cube is turned off, either manually by the user, or automatically.

The user may enlarge or reduce the apparent size of the object (for example, zoom-in or zoom-out) to adjust the portion of the object displayed within the view cube, in some embodiments. For example, the apparent size of the object may be changed (for example, enlarged or reduced) by the user while the view cube is displayed. In illustrative embodiments, a user may "zoom-in" on the object or a part of the object, and still have the view cube available to manipulate the enlarged view. Similarly, the user may "zoom-out" from the object to bring more of the object into view, or into the view cube.

Various embodiments of the view manipulation cube may allow a user to manipulate the orientation of a 3-D model without diverting the user's eyes from the displayed model. The orientation of the model may change in concert with, and in response to, the user's manipulation of the cube, so that the user knows exactly what view will be presented when the manipulation is complete.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed either on a tangible medium, such as a computer readable medium (e.g., a diskette, CD-ROM, ROM, memory card, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. For example, a view manipulation apparatus may be used with or without other features, such as control points (such as text on a surface of a view manipulation apparatus, or objects on an edge or at a corner of faces of a view manipulation apparatus), or a coordinate system. Further, these features may be used in various combinations (for example, a coordinate system with or without one or more types of control points). All such variations and modifications are intended to be within the scope of the present invention as defined in any appended claims.

What is claimed is:

1. A method of displaying a three-dimensional scene on a display device, the method comprising:
    processing graphics data to render a three-dimensional object;
    displaying the object such that the displayed object has an apparent size as displayed on the display device;
    in response to activation by the user, rendering a three-dimensional representation of a view manipulation apparatus;
    displaying the apparatus such that the apparatus surrounds the object, and the apparatus and object maintain a fixed orientation relative to one another when the orientation of the apparatus is manipulated on the display device; and
    without additional user action, reducing the apparent size of the object in reaction to the display of the apparatus.

2. A method according to claim 1, wherein the apparatus comprises a cube, and displaying the apparatus comprises simultaneously displaying six faces, eight corners, and twelve edges of the cube within the scene.

3. A method according to claim 1, wherein the apparatus further comprises a control feature that, when activated, causes the orientation of the object to change to display the object from the vantage point of the activated control feature.

4. A method according to claim 3, wherein the apparatus comprises a polyhedron, and the control feature comprises a three-dimensional object at a corner of the apparatus.

5. A method according to claim 3, wherein the apparatus comprises a polyhedron, and the control feature comprises a three-dimensional object at an edge formed by two faces of the apparatus.

6. A method according to claim 3, wherein the control feature comprises a three-dimensional object on a face of the apparatus.

7. A method according to claim 6, wherein the control feature comprises text.

8. A method according to claim 1, wherein orientation of the apparatus and object may be manipulated by dragging a corner, edge or face of the apparatus on the display device.

9. A method according to claim 1, the method further comprising:
    changing the view of the object by manipulating the apparatus;
    terminating the display of the apparatus; and
    increasing the apparent size of the object on the display device in reaction to terminating the display of the apparatus.

10. A method according to claim 1, the method further comprising:
    displaying a multiple-axis coordinate system within the apparatus, such that the coordinate system maintains a fixed orientation relative to the object and the apparatus when the apparatus is moved on the display device.

11. A method according to claim 10 wherein the coordinate system comprises three axes, each axis orthogonal to the others.

12. A method according to claim 11 wherein the object and the coordinate system are displayed at the geometric center of the apparatus.

13. A method according to claim 10, further comprising rotating the object about an axis when that axis is selected by a user.

14. A method according to claim 10, further comprising panning the object along an axis when that axis is selected by a user.

15. A method according to claim 10, further comprising displaying the object from a pre-defined vantage point when the intersection of two axes is selected by a user.

16. A non-transitory storage medium comprising instructions executable by a processor for displaying a three-dimensional scene on a display device, the computer program product comprising a computer useable medium having computer readable program code thereon, the computer readable program code comprising:
   program code for processing graphics data to render a three-dimensional object;
   program code for displaying the object such that the displayed object has an apparent size as displayed on the display device;
   program code for rendering a three-dimensional representation of a view manipulation apparatus;
   program code for displaying the apparatus in response to activation of the view manipulation apparatus by a user, such that the apparatus surrounds the object and maintains a fixed orientation relative to the object when the orientation of the apparatus is manipulated on the display device; and
   program code for reducing, without additional user action, the apparent size of the object on the display device in reaction to displaying the apparatus.

17. The non-transitory storage medium according to claim 16, wherein the apparatus comprises a cube, and the program code for displaying the apparatus comprises program code for displaying six faces, eight corners, and twelve edges of the cube within the scene.

18. The non-transitory storage medium according to claim 16, the program code for rendering a three-dimensional representation of a view manipulation apparatus and the program code for displaying the apparatus further comprising program code displaying a control feature as part of the apparatus that, when activated, causes the orientation of the object to change to display the object from the vantage point of the activated control feature.

19. The non-transitory storage medium according to claim 18, wherein the apparatus comprises a polyhedron, and the control feature comprises a three-dimensional object at a corner of the apparatus.

20. The non-transitory storage according to claim 18, wherein the apparatus comprises a polyhedron, and the control feature comprises a three-dimensional object at an edge formed by two faces of the apparatus.

21. The non-transitory storage medium according to claim 16, the program code for rendering a three-dimensional representation of a view manipulation apparatus and the program code for displaying the apparatus further comprising program code for displaying one or more three-dimensional symbols on at least one face of the apparatus.

22. The non-transitory storage medium according to claim 21, wherein the one or more symbols comprise characters of text.

23. The non-transitory storage medium according to claim 21, wherein selecting one of the one or more symbols causes the orientation of the object and the apparatus to display the object from the vantage point of the face on which the one or more symbols are displayed.

24. The non-transitory storage medium according to claim 16, further comprising:
   program code for changing the view of the object by manipulating the apparatus;
   program code for suspending the display of the apparatus; and
   program code for increasing the apparent size of the object on the display device in reaction to suspending the display of the apparatus.

25. The non-transitory storage medium according to claim 16, further comprising:
   program code for displaying a multiple-axis coordinate system within the apparatus, such that the coordinate system maintains a fixed orientation to the object and the apparatus when the apparatus is moved on the display device.

26. The non-transitory storage medium according to claim 25 wherein the coordinate system comprises three axes, each axis orthogonal to the others.

27. The non-transitory storage medium according to claim 26, wherein the program code for displaying the object and the multiple-axis coordinate system further comprises computer code for displaying the object and the coordinate system at the geometric center of the apparatus.

28. The non-transitory storage medium according to claim 25, wherein the program code for displaying the object and the multiple-axis coordinate system further comprises:
   computer code for allowing a user to select an axis for rotating the object about the selected axis; and
   computer code for rotating the object about the selected axis.

29. The non-transitory storage medium according to claim 25, wherein the program code for displaying the object and the multiple-axis coordinate system further comprises:
   computer code for allowing a user to select an axis for panning the object along the selected axis; and
   computer code for panning the object along the selected axis.

30. An apparatus for displaying a three-dimensional scene on a display device, the apparatus comprising:
   an object display module capable of processing graphics data to render a three-dimensional image of an object and capable of displaying the object, the displayed object having an apparent size as displayed on the display device;
   a view manipulation apparatus module capable of rendering a three-dimensional image of a view manipulation apparatus comprising a plurality of faces and visible edges, and capable of displaying, in response to activation of the view manipulation apparatus by a user, the apparatus surrounding the object such that the apparatus maintains a fixed orientation relative to the object when the orientation of the apparatus is moved on the display device; and
   an apparent size reduction module capable of reducing, without additional user action, the apparent size of the object on the display device in reaction to the display of the apparatus.

31. An apparatus according to claim 30, wherein the apparatus is a cube, and the object display module is further capable of simultaneously displaying six faces, eight corners, and twelve edges of the cube within the scene.

32. An apparatus according to claim 30, wherein the view manipulation apparatus module is further capable of displaying a control feature on the apparatus that, when activated, cause the orientation of the object to change to display the object from the vantage point of the activated control feature.

33. An apparatus according to claim 32, wherein the apparatus comprises a polyhedron, and the control feature comprises a three-dimensional object at a corner of the apparatus.

34. An apparatus according to claim 32, wherein the apparatus comprises a polyhedron, and the control feature comprises a three-dimensional object at an edge formed by two faces of the apparatus.

35. An apparatus according to claim 32, wherein the control feature comprises one or more three-dimensional objects on a face of the apparatus.

36. An apparatus according to claim 30, further comprising
   a rotation module capable of changing the view of the object in response to manipulation of the apparatus by dragging a corner, edge or face of the apparatus on the display device.

37. An apparatus according to claim 36, further comprising:
   a view manipulation apparatus removal module capable of terminating the display of the apparatus; and
   an apparent size increase module capable of increasing the apparent size of the object on the display device in response to terminating the display of the apparatus.

* * * * *